US011760264B2

(12) United States Patent
Petrillo et al.

(10) Patent No.: US 11,760,264 B2
(45) Date of Patent: *Sep. 19, 2023

(54) SYSTEM AND METHOD FOR PROVIDING FRONT-ORIENTED VISUAL INFORMATION TO VEHICLE DRIVER

(71) Applicant: Klear-View Camera LLC, Danville, NH (US)

(72) Inventors: Steven R. Petrillo, Pelham, NH (US); Robert M. Roeger, Danville, NH (US)

(73) Assignee: Klear-View Camera LLC, Danville, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,251

(22) Filed: Jun. 7, 2022

(65) Prior Publication Data

US 2022/0314880 A1  Oct. 6, 2022

Related U.S. Application Data

(63) Continuation of application No. 17/219,145, filed on Mar. 31, 2021, now Pat. No. 11,383,643, which is a
(Continued)

(51) Int. Cl.
*B60R 1/00* (2022.01)
*B60K 35/00* (2006.01)
(Continued)

(52) U.S. Cl.
CPC ............... *B60R 1/00* (2013.01); *B60K 35/00* (2013.01); *B60Q 9/008* (2013.01);
(Continued)

(58) Field of Classification Search
CPC .... B60R 1/00; B60K 35/00; B60K 2370/152; B60Q 9/008; G01C 21/3697
See application file for complete search history.

(56) References Cited

U.S. PATENT DOCUMENTS 5,530,421 A   6/1996 Marshall
5,708,857 A   1/1998 Ishibashi
(Continued)

FOREIGN PATENT DOCUMENTS

EP   1129904 A2   9/2001
EP   1705623 A1   9/2006
GB   2462698 A    2/2010

OTHER PUBLICATIONS

International Search Report and Written Opinion for PCT Appl. No. PCT/US2013/054828 dated May 21, 2014, 13 pages.
(Continued)

*Primary Examiner* — On S Mung
(74) *Attorney, Agent, or Firm* — Maine Cernota & Rardin; Walter F. Dawson

(57) ABSTRACT

A camera system is installed on the front end of a vehicle, either on the left front, the right front, or both sides. The camera is linked via wired or wireless connection to an onboard computer and a navigation display that is located within the passenger compartment of the vehicle. The driver reviews a visual description on the display of any oncoming traffic in the form of motor vehicles, pedestrians, cyclists, animals and the like on the navigation display via a single screen, split screen or alternating screens. The camera system can include a speed sensor that detects when the vehicle reaches a threshold speed to activate or de-activate the camera. Alternatively, the computer can activate the system when a turn signal is activated, and de-activate the system when the turn signal is no longer activated. This camera system can be retrofitted into older vehicles.

20 Claims, 14 Drawing Sheets

Related U.S. Application Data continuation of application No. 16/696,205, filed on Nov. 26, 2019, now Pat. No. 10,994,657, which is a continuation of application No. 15/368,099, filed on Dec. 2, 2016, now Pat. No. 10,525,884, which is a continuation of application No. 14/428,881, filed as application No. PCT/US2013/054828 on Aug. 14, 2013, now Pat. No. 9,511,711, and a continuation-in-part of application No. 13/587,548, filed on Aug. 16, 2012, now abandoned.

(60) Provisional application No. 61/592,505, filed on Jan. 30, 2012.

(51) Int. Cl.
*B60Q 9/00* (2006.01)
*G01C 21/36* (2006.01)

(52) U.S. Cl.
CPC .... *G01C 21/3697* (2013.01); *B60K 2370/152* (2019.05); *B60K 2370/168* (2019.05); *B60K 2370/176* (2019.05); *B60K 2370/179* (2019.05); *B60K 2370/193* (2019.05); *B60K 2370/21* (2019.05); *B60K 2370/52* (2019.05); *B60R 2300/105* (2013.01); *B60R 2300/302* (2013.01); *B60R 2300/303* (2013.01); *B60R 2300/404* (2013.01); *B60R 2300/406* (2013.01); *B60R 2300/605* (2013.01); *B60R 2300/70* (2013.01); *B60R 2300/802* (2013.01)

(56) References Cited

U.S. PATENT DOCUMENTS

| | | | |
|---|---|---|---|
| 6,046,766 | A | 4/2000 | Sakata |
| 6,320,612 | B1 | 11/2001 | Young |
| 6,400,405 | B2 | 6/2002 | Tomida |
| 7,038,577 | B2 | 5/2006 | Pawlicki |
| 7,053,795 | B2 | 5/2006 | Maemura |
| 7,162,370 | B2 | 1/2007 | Obradovich |
| 7,579,940 | B2 | 8/2009 | Schofield |
| 7,581,859 | B2 | 9/2009 | Lynam |
| 7,679,498 | B2 | 3/2010 | Pawlicki |
| 7,881,496 | B2 | 2/2011 | Camilleri |
| 7,944,371 | B2 | 5/2011 | Foote |
| 8,017,898 | B2 | 9/2011 | Lu |
| 8,058,977 | B2 | 11/2011 | Lynam |
| 8,339,253 | B2 | 12/2012 | Chundrlik, Jr. |
| 8,643,724 | B2 | 2/2014 | Schofield |
| 9,000,903 | B2 | 4/2015 | Bowers |
| 9,014,904 | B2 | 4/2015 | Higgins-Luthman |
| 9,183,749 | B2 | 11/2015 | Karner |
| 9,232,195 | B2 | 1/2016 | Lang |
| 9,305,463 | B1 | 4/2016 | Yellambalase |
| 9,428,185 | B2 | 8/2016 | Yellambalase |
| 2001/0022553 | A1 | 9/2001 | Pala |
| 2002/0003571 | A1 | 1/2002 | Schofield |
| 2002/0019703 | A1 | 2/2002 | Levine |
| 2002/0118282 | A1 | 8/2002 | Nakamura |
| 2003/0025597 | A1 | 2/2003 | Schofield |
| 2003/0052773 | A1 | 3/2003 | Sjonell |
| 2003/0137586 | A1 | 7/2003 | Lewellen |
| 2004/0119610 | A1 | 6/2004 | Maemura |
| 2004/0143373 | A1 | 7/2004 | Ennis |
| 2005/0040939 | A1 | 2/2005 | Jobes |
| 2006/0119473 | A1 | 6/2006 | Gunderson |
| 2006/0145463 | A1 | 7/2006 | Isaji |
| 2006/0164230 | A1 | 7/2006 | DeWind |
| 2006/0215020 | A1 | 9/2006 | Mori |
| 2007/0088488 | A1 | 4/2007 | Reeves |
| 2008/0079553 | A1 | 4/2008 | Boice |
| 2008/0106389 | A1 | 5/2008 | Desai |
| 2008/0291000 | A1 | 11/2008 | Kim |
| 2008/0319652 | A1 | 12/2008 | Moshfeghi |
| 2009/0189373 | A1 | 7/2009 | Schramm |
| 2009/0192683 | A1 | 7/2009 | Kondou |
| 2010/0292895 | A1 | 11/2010 | Nakamura |
| 2010/0321758 | A1 | 12/2010 | Bugno |
| 2011/0115615 | A1* | 5/2011 | Luo ............................ B60R 1/00 348/148 |
| 2011/0167460 | A1 | 7/2011 | Tranchina |
| 2012/0229882 | A1 | 9/2012 | Fish, Jr. |
| 2012/0296522 | A1 | 11/2012 | Otuka |
| 2012/0316876 | A1 | 12/2012 | Jang |
| 2013/0016209 | A1 | 1/2013 | Taylor |
| 2013/0170013 | A1 | 7/2013 | Tonar |
| 2013/0332004 | A1 | 12/2013 | Gompert |
| 2013/0345929 | A1 | 12/2013 | Bowden |
| 2014/0139669 | A1 | 5/2014 | Petrillo |
| 2016/0114728 | A1 | 4/2016 | Tan |
| 2016/0119587 | A1 | 4/2016 | Tan |
| 2016/0193997 | A1 | 7/2016 | Yellambalase |

OTHER PUBLICATIONS

International Preliminary Report on Patentability for PCT Appl. No. PCT/US2013/054828 dated Feb. 26, 2015, 12 pages.
Office Action for U.S. Appl. No. 14/428,881 dated Nov. 16, 2015, 25 pages.
Extended European Search Report for Patent Appl. No. EP13850546.6 dated Apr. 25, 2016, 6 pages.
Final Office Action for U.S. Appl. No. 14/428,881 dated May 12, 2016, 33 pages.
Notice of Allowance for U.S. Appl. No. 14/428,881 dated Sep. 2, 2016, 20 pages.
Notice of Allowance for U.S. Appl. No. 14/428,881 dated Oct. 6, 2016, 13 pages.
European Office Action for Patent Appl. No. EP13850546.6 dated Jul. 26, 2018, 5 pages.
Office Action for U.S. Appl. No. 15/368,099 dated Aug. 29, 2018, 25 pages.
Notice of Allowance for U.S. Appl. No. 15/368,099 dated Sep. 5, 2019, 7 pages.
Notice of Allowance for U.S. Appl. No. 15/368,099 dated Nov. 7, 2019, 5 pages.
Canadian Office Action for Patent Appl. No. CA2885177 dated Feb. 26, 2020, 3 pages.
Office Action for U.S. Appl. No. 16/696,205 dated Oct. 16, 2020, 8 pages.
Notice of Allowance for U.S. Appl. No. 16/696,205 dated Jan. 6, 2021, 8 pages.
Office Action for U.S. Appl. No. 17/219,145 dated Nov. 24, 2021, 7 pages.
Notice of Allowance for U.S. Appl. No. 17/219,145 dated Mar. 11, 2022, 7 pages.

* cited by examiner

SYSTEM AND METHOD FOR PROVIDING FRONT-ORIENTED VISUAL INFORMATION TO VEHICLE DRIVER

RELATED APPLICATIONS

This application is a continuation of U.S. patent application Ser. No. 17/219,145, filed Mar. 31, 2021, which is a continuation of U.S. patent application Ser. No. 16/696,205, filed Nov. 26, 2019, now U.S. Pat. No. 10,994,657, which is a continuation of U.S. patent application Ser. No. 15/368,099, filed Dec. 2, 2016, now U.S. Pat. No. 10,525,884, which is a continuation of U.S. patent application Ser. No. 14/428,881, filed Mar. 17, 2015, now U.S. Pat. No. 9,511,711, which is a 371 U.S. National Stage of International Application No. PCT/US2013/054828, filed Aug. 14, 2013, which is a continuation in part of U.S. patent application Ser. No. 13/587,548, filed Aug. 16, 2012, which is now abandoned, which claims the benefit of U.S. Provisional Application No. 61/592,505, filed Jan. 30, 2012, and U.S. Provisional Application No. 61/860,573, filed Jul. 31, 2013, the entire disclosures of all said applications being expressly incorporated by reference herein.

FIELD OF THE INVENTION

This invention relates to vehicle safety devices, and more particularly to visual displays that enhance vehicle safety.

BACKGROUND OF THE INVENTION

Each year, thousands of people die or are badly injured in automobile accidents. One situation that causes needless accidental deaths and injury arises when a car moves into a street or motorway from a position that is perpendicular to the axis of that street or motorway. This can occur when a vehicle is moving out of a street, parking garage or parking space. Drivers pulling into oncoming traffic from such a position must begin by placing the front end of their vehicle far enough out into the street that they can now directly view the oncoming traffic. Cars parked along the side of the street can impair that visual "read" of the traffic, forcing the driver to protrude ever farther into the oncoming traffic, at increasing risk to life, limb and vehicle to pedestrians, cyclist, animals and other motorists.

The present state of the art for vehicle safety includes the use of cameras mounted on the rear of vehicles to reduce collisions occurring as a result of a vehicle backing up. These systems utilize a small, pre-positioned stationary camera on the rear exterior of the vehicle and a visual display within the driver's compartment. This can be accompanied by alarm devices that utilize modem proximity alert devices (for example, infrared technology) to detect an unseen obstacle (such as a child or a housecat) and call the driver's attention to the display and the obstacle.

SUMMARY OF THE INVENTION

The above described systems have a limited field of view and are easily damaged or knocked off the vehicle. Likewise, they often require a dedicated display that adds further distraction to the driver. In addition, such cameras often remain activated longer than needed. Moreover, such cameras are not mounted to contemplate particular hazardous situations, such as the pull out into traffic to execute a turn or merge into traffic.

Some embodiments described herein overcome disadvantages of the prior art by providing in a vehicle, a non-protruding front side vehicle camera system and method for operating the same. In some embodiments, the non-protruding front side vehicle camera is flush mounted. In other embodiments, the non-protruding front side vehicle camera is recessed behind a surface of one or both front quarter panels. In some embodiments, the non-protruding front side vehicle camera is on the left front quarter panel. In some embodiments, the non-protruding front side vehicle camera is on the right front quarter panel. In some embodiments, respective non-protruding front vehicle cameras are on each front quarter panel.

The camera is linked to an onboard computer and a navigation display that is placed within the passenger compartment of the automobile. The driver receives a visual description on the display of any oncoming traffic in the form of motor vehicles, pedestrians, cyclists, animals and the like. In some embodiments, the camera system is furnished with a speed sensor that detects when the automobile reaches a threshold speed (for example, 3 miles per hour). In other embodiments, a different threshold speed is selected and used. The front side vehicle camera system is activated and de-activated automatically, based on the selected threshold speed. In some embodiments, the camera system activation and de-activation process begins when the vehicle that includes the camera is shifted into the "Drive" gear (for a car equipped with an automatic transmission), or first gear (for a car with a standard or semi-automatic transmission). The video signal is transmitted to the navigation display and displayed thereon in place of the ordinary navigation screen, in single or split screen. As soon as the driver accelerates to the threshold speed, a signal is sent to the computer to shut off the camera, or to return the camera to the navigation route (if any) being displayed prior to activation of the turn sequence. The computer now shuts down the camera and instructs the navigation display to return its screen display to the ordinary navigation display.

This system advantageously improves safety for vehicles moving into a line of traffic (turn) from a position that is perpendicular to the flow of that traffic and that are pulling out of a side street, building, garage or parking spot (merge). Often, such vehicles face hazards in performing these maneuvers because the driver must pull far enough forward to visually observe the near lane of traffic from his or her vantage point-which is typically several feet behind the front end of the vehicle. Illustratively, a protrusion of 4-6 feet or more is desirable in order for the driver to view the lane and determine whether to proceed or wait. During the movement to the protruded position, the front end of the car is vulnerable to being struck by other vehicles that are unseen to the driver, resulting in numerous accidents. The illustrative system and method provides a flush-mount or recessed camera at the specific location on the vehicle to minimize this hazard by transmitting an image of the scene of oncoming traffic to the driver from a vantage point that is essentially as far forward as possible.

Illustratively, in some embodiments, the camera is located in and is flush with the left front quarter panel. The front quarter panel is the outer portion of the vehicle forward of the passenger compartment along the left and right sides and typically includes a marker light and headlight assembly. The camera is generally free of any external protrusion relative to the vehicle body and/or its quarter panel, thereby avoiding potential damage to the camera and/or a restricted field of view. In some embodiments, the flush-mounted or recessed camera can image a field of view within an arc of approximately 90 degrees in both the horizontal and vertical axes (thereby defining a viewing cone). Other embodiments provide different cross sectional geometries—e.g. a geometry defining an elliptical cone with a wider horizontal axis. In various embodiments, an associated camera lens can define a field of greater or lesser than 90 degrees in the horizontal and/or vertical axes. In other embodiments, the system can allow the driver to select the desired angle and/or range of view via an interface or other adjustment mechanism within the vehicle. The camera can also include a preset or variable zoom lens, thereby allowing the driver to focus over a greater or lesser distance.

This display can also be accompanied by a proximity alert. In alternative embodiments, the visual display can use a heads-up projected display system, the onboard computer display, a separate and dedicated display or a link to a head-mounted glasses display worn by the driver. In other embodiments, a plurality of two (or more) cameras are mounted in each respective one of the front quarter panels, one on the left side as described above, and one on the right side, for vehicles entering a one-way street with traffic travelling from right to left relative to the driver or vehicles that may be transported between the United Kingdom and Europe, and back, or vice-versa. In other embodiments, such a camera system as set forth above can be fitted onto trucks of all sizes, recreational vehicles, tractors, heavy equipment, cycles and motorcycles, quadricycles, military vehicles (such as tanks and other armored vehicles with limited visibility and massive height), or other vehicles.

In an illustrative embodiment, a system and method for providing front-oriented visual information to a vehicle driver includes a flush-mounted or recessed camera located at least in the left front quarterpanel. Alternatively, or additionally, a flush-mounted or recessed camera can be mounted on the right front quarterpanel. A speed sensor detects vehicle speed. This speed sensor can be based upon an existing vehicle system, such as the braking system and/or the speedometer or can be a separate sensor. A display (e.g. a screen or projection) within the vehicle provides the driver with at least one of images and video feed of a scene imaged by the camera. An onboard computer (or other processing device) processes the detected vehicle speed and selectively allows the images and video feed to be displayed on the display based upon whether the vehicles speed is less than a threshold speed. In general, the computer instructs the camera system and/or certain connected components to activate and deactivate depending on the relative vehicle speed. Illustratively, the display can comprise an onboard navigation screen. The camera can image a field of view of approximately 90 degrees in at least one of a horizontal plane and a vertical plane. Where two cameras are employed (i.e. on each of the left front and right front quarter panels), the display of images and/or video from one camera and the display images and/or video from the other camera is performed using a split screen image.

The camera can also include a user-controllable zoom lens that allows the driver to vary the field of view and/or magnification. Either or both cameras can include a co-mounted proximity sensor. The proximity sensor can be constructed and arranged to detect a nearby object, and cause a visual alert message to be displayed on the display and/or an audible alert to be played via a speaker. Illustratively, the threshold speed can be approximately 3 miles per hour as such speed is considered sufficiently low that the driver can react appropriately while interacting with the display screen. This threshold can be user-adjustable via an interface within the vehicle in various embodiments. More generally some or all of the functions of the system can be operated using voice activation.

The camera system can be provided with a proximity and speed sensor that determines the range of an oncoming object and transmits the data to the computer. The computer provides an alert when the object is at least one of (a) within a predetermined distance and (b) approaching at a predetermined speed. In some embodiments the camera can be retrofitted into an existing front headlight pod and includes a wireless link to communicate with at least one of the display and computer. The system can include a solar power assembly that powers the camera and wireless.

BRIEF DESCRIPTION OF THE DRAWINGS

The invention description below refers to the accompanying drawings, of which.

DETAILED DESCRIPTION

When a motor vehicle driver is situated so as to be perpendicular to the flow of traffic and pulling out of a side street, building, garage or parking spot, there is a danger to that driver and other operators. In order to see traffic in the oncoming lane, the driver has to pull far enough forward to visually observe the near lane of traffic. Other vehicles and objects placed along a roadway and other obstructions can prevent a clear view and necessitate a driver pulling forward into the near lane. Given that most vehicles have a front end that includes a motor or a storage compartment with a length of about 2-4 feet and that a driver typically sits another 2 feet or more from the dashboard, the driver may move the car until there is a protrusion of 4-6 feet or more, in order for the driver to view the lane and determine whether to proceed or wait. During the movement to the protruded position, the front end of the car is vulnerable to being struck by other vehicles that are unseen to the driver. This results in numerous accidents. The installation of the front side vehicle system reduces the protrusion of the vehicle to about six inches. In the present application, the term "front left" refers to an American-style roadway in which the oncoming traffic approaches from the left relative to the driver when entering the nearest lane on a two-way street. In other embodiments configured for an English-style system, the oncoming traffic approaches from the right relative to the driver, so the camera will be mounted on the front right of the vehicle.

Figure 1:
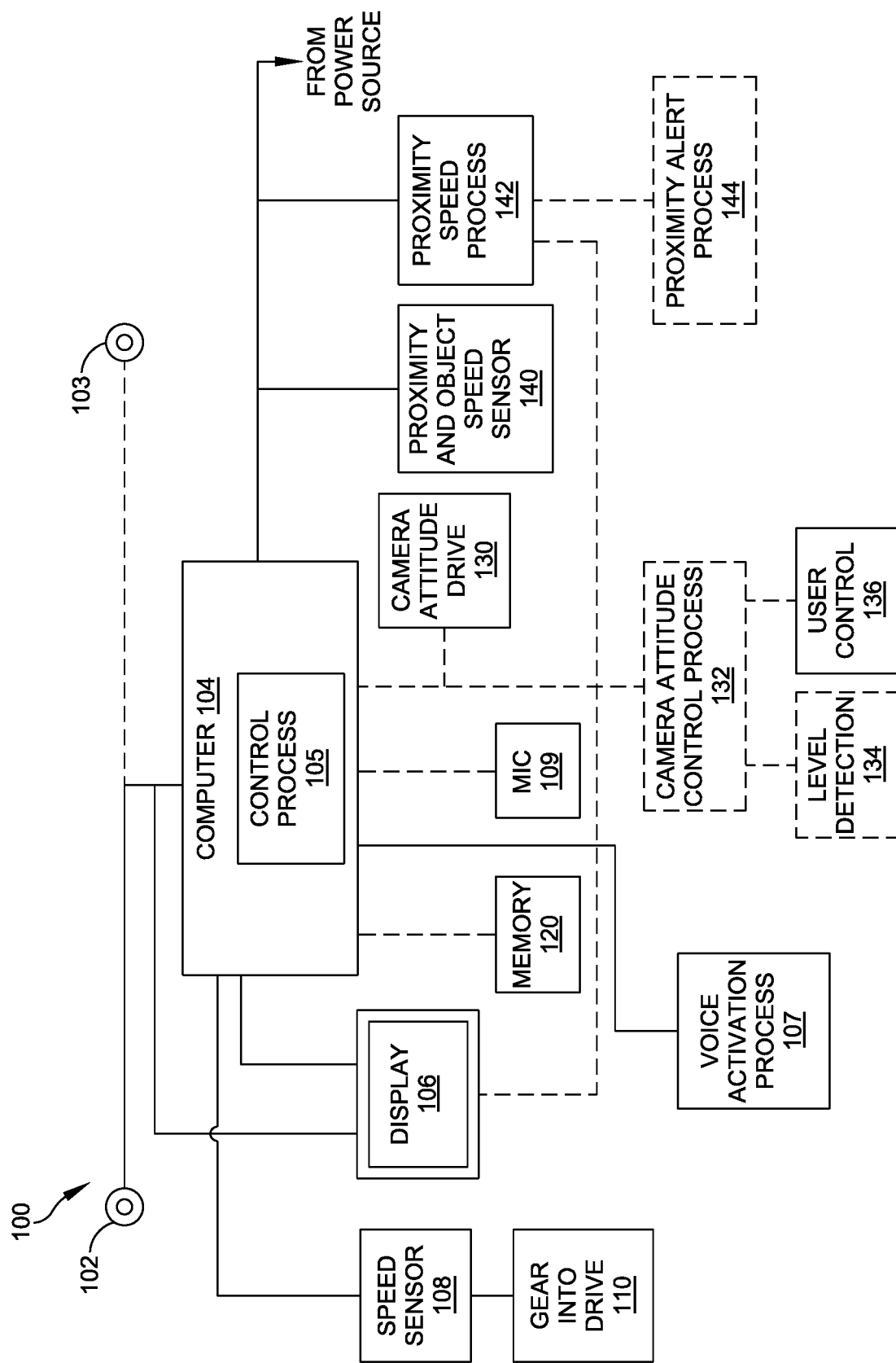
FIG. 1 is a schematic view of an exemplary front end camera system mounted in a vehicle, according to an illustrative embodiment.

FIG. 1 is a schematic view of an exemplary front left vehicle camera system 100. The camera 102 is installed in the front left quarter panel region of the vehicle (not shown). An optional front right camera 103 will be described more fully below. Camera 102 is linked via wired or wireless connection to an onboard computer 104 with a control process 105 and a commercially available navigation display 106 that is placed within the passenger compartment of the vehicle. The driver receives a visual description on the display 106 of any oncoming traffic in the form of motor vehicles, pedestrians, cyclists, animals and the like. The camera system 100 can be powered by a 12 Volt power supply or other applicable power supply having a higher or lower voltage and current. The camera system equipped with a speed sensor 108 that detects when the vehicle 100 reaches a threshold speed, in this embodiment, of 3 miles per hour. The speed sensor 108 receives input from the vehicle transmission (not shown) and the computer 104. The speed sensor 108 transmits the information for the threshold speed to the display 106 and/or computer 104. In some embodiments, the wiring harness uses conventional connectors and existing "off the shelf" technology. In other embodiments, a future developed connector and/or power transmission medium is used. The computer 104 can be provided with a transmitter/receiver for wireless communication with wireless sensors and cameras.

The 3 miles per hour threshold speed is determined in part by the transmission after the vehicle is put into the "Drive" gear setting 110 and is communicated both to the speed sensor 108 and the computer 104 simultaneously via wired or wireless communication. It is contemplated that the threshold speed can be set by the driver to a higher or lower speed, or to a range, depending on the driver's requirements. For example, a driver can require a range of 2-4 miles per hour, 3-5 miles per hour or 5-10 miles per hour, depending on the desired start-up velocity. In a situation where the traffic is moving quickly, a higher range can be desired. The threshold speed sensor can interface with any number of the systems within the vehicle that measure speed. These include the speedometer, anti-lock braking system, the door lock system, engine rpm, GPS (ground positioning satellite) or combination thereof. In a further embodiment, the activation and de-activation can be voice-activated by the driver. It is further contemplated that this camera system can be retrofitted into older vehicles.

The computer 104 can include an optional voice activation process 107 that is accessed via a microphone 109. The computer 120 can also be provided with a memory application 120 that records events and pullouts for records or later analysis. Activating the various settings for threshold speed and other settings can be accomplished via the display screen, a touch screen interface, a remote control or other device. In a further embodiment, the vehicle can be equipped with a level detection device 134 that determines the attitude of the vehicle relative to the horizon. The vehicle camera(s) can be equipped with one or more servo motors (or another type of actuator, such as a stepper motor) to orient at least one of the cameras, as will be described more fully below. The computer 104 can be provided with a process for receiving the information from the level detection device 134 that determines the optimal attitude for the cameras and a camera attitude control process 132 instructs the camera servo motors to make the proper adjustments. This attitude adjustment control can be manually operated 136 by the user.

In a further embodiment, the computer 104 is configured by software to execute a process for receiving and acting upon data from proximity sensors, as described more fully below. The proximity sensors transmit data to the computer 104 that includes the detected proximity and speed of the nearest vehicle 140 in the traffic lane and processes that information 142 for display. In an additional embodiment, the vehicle has a proximity alert, as set forth more fully below, that is activated by the proximity speed process 142 and generates an alert 144.

Figure 2:
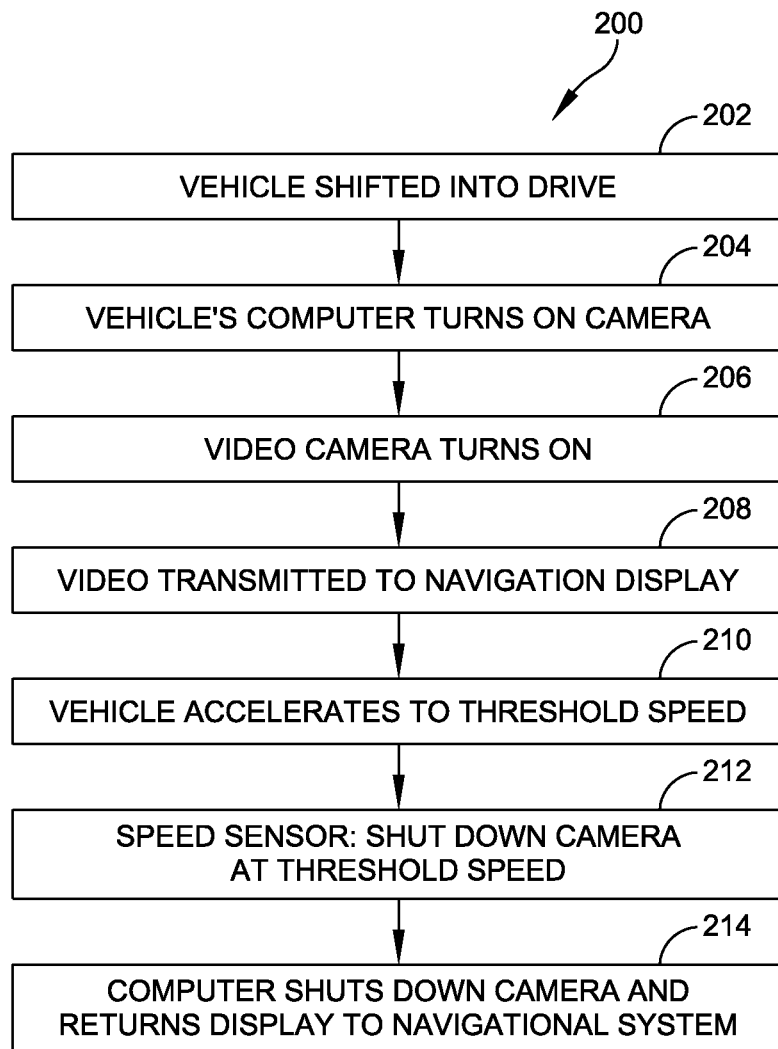
FIG. 2 is a schematic view of the activation and de-activation of the camera system, according to an illustrative embodiment.

The front side vehicle camera system is activated and de-activated automatically as set forth in FIG. 2. Note, as used herein the terms "activated" and "de-activated" can relate to at least one of the activation/de-activation of the actual camera, the activation/de-activation of the display and/or the activation/deactivation of the communication/data link(s) between the camera, computer and display. The camera system activation and de-activation process 200 begins when the vehicle that includes the camera is shifted into the "Drive" gear (for a vehicle having an automatic transmission) or first gear (for a vehicle having a standard or semi-automatic transmission) at step 202. At step 204, the transmission instructs the computer that the vehicle is in the "Drive" gear or first gear, and the vehicle's computer turns on the camera and, at step 206, the computer starts the video camera function. At step 208, the video signal is transmitted to the navigation display and displayed thereon in place of the ordinary navigation screen. As soon as the driver pulls out and accelerates to the threshold speed at step 210, a signal is sent to the speed sensor and at step 212, the speed sensor instructs the computer that the vehicle is traveling at the threshold speed of 3 miles per hour and to shut off the camera. The computer now shuts down the camera and, at step 214, instructs the navigation display to return its screen display to the ordinary navigation display.

Figure 3:
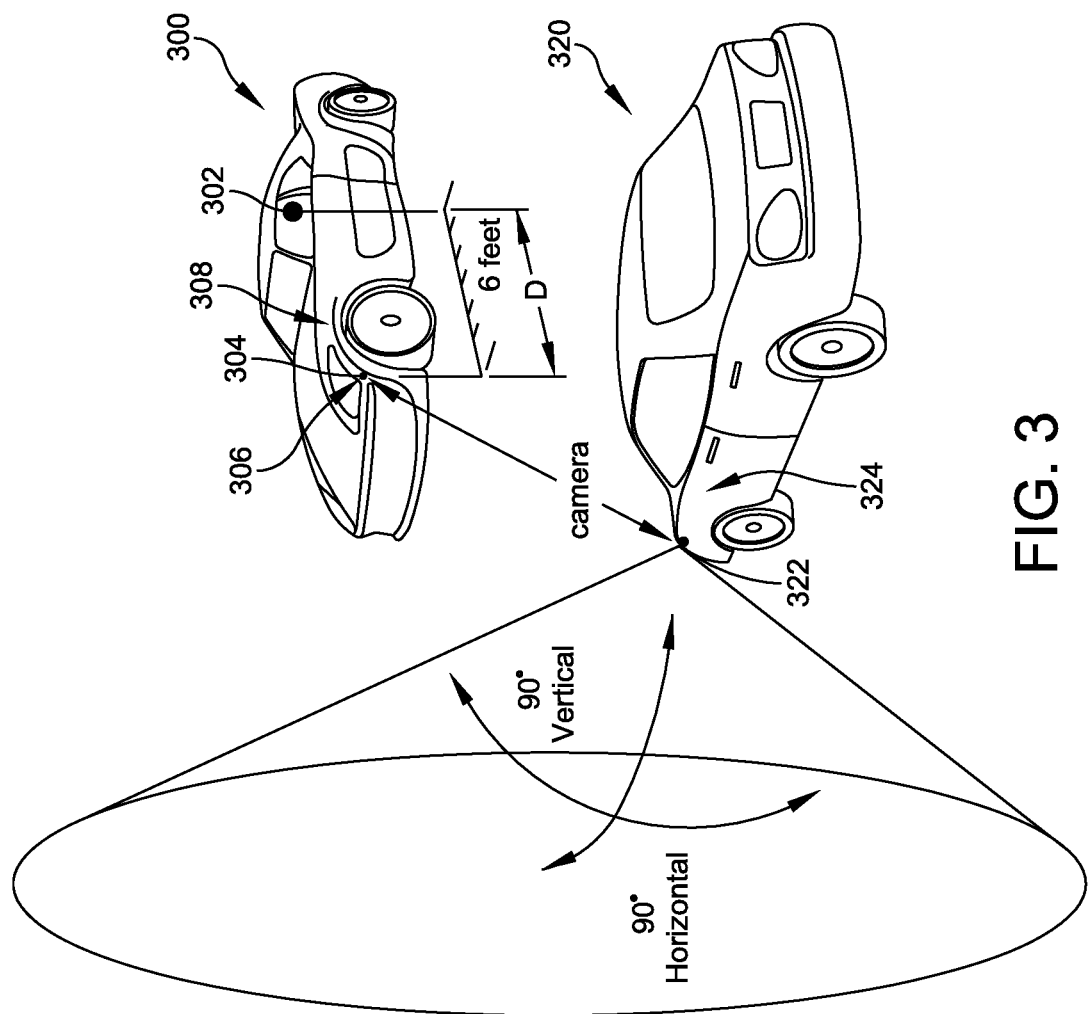
FIG. 3 is a view of two exemplary automobiles of different shapes having an exemplary left front camera, according to an illustrative embodiment.

FIG. 3 is a view of two illustrative automobiles of different shapes having an illustrative left front camera. Vehicle 300 is a sports car type vehicle with two seats and a reclined driver position. The distance D between the reclined driver position 302 and the camera location 304 (about six inches to the rear of the forward left leading edge of the vehicle) is about 6 feet. In some embodiments, the camera 306 is located in and flush with the left front quarter panel 308, providing the driver with a full visual display of oncoming objects. In other embodiments, the camera 306 is slightly recessed behind the surface of the front quarter panel 308, while still maintaining a desired field of view. The camera 306 is not externally mounted and does not protrude from the quarter panel. Externally mounted cameras tend to produce blind spots that a flush-mounted camera does not produce. Externally mounted cameras are physically more vulnerable to being inadvertently damaged due to bushes, obstacles, stones and other physical risks. The camera 322 mounted in the left front quarter panel 324 of the sedan-type vehicle 320 is also flush-mounted. Cameras 306, 322 can be provided with a field of view that describes an arc of about 90 degrees in the horizontal and about 90 degrees in the vertical axes according to the illustrative embodiment. The cameras can be auto-focused or selectively focused by the user. In some embodiments, a camera lens with a field of view greater or lesser than 90 degrees in the horizontal and vertical axes can be utilized. In other embodiments, a lens giving a field of view as great as 150 degrees is used. The camera lens can be provided with a zoom lens that is automatically operated by the computer 104 and/or the user. In other embodiments, the camera is a digital camera equipped with a digital zoom to permit the user to view an enlarged cropped view of a subset of the pixels of the camera 306. As noted above, the camera can be furnished with an integral proximity sensor and the computer can be activated thereby to provide a proximity alert, either by an audio alert, visual alert or a combination thereof. In some embodiments, the proximity sensor is a commercially available sensor and the types available for this application can include capacitive, capacitive displacement sensors, Doppler effect (sensor based on effect), eddy-current, inductive, laser rangefinder, infrared, sonic, ultrasonic, LIDAR, stereoscopic, magnetic, passive optical, passive thermal infrared, reflective photocell, radar, ionizing radiation reflector or thermal sensors. The proximity speed process can process a continuous stream of information from the proximity sensor(s) or a series of frame-by-frame images. In general, the proximity speed process 142 uses known technologies to derive distance and compare distance to time so as to provide a continuous velocity reading for the object.

As stated above, the camera projects an image of the roadway within the field of view and assists the driver in looking for oncoming traffic. This is projected as a single screen or, in the case of cameras mounted on each front corner, as a split screen or alternating. For example, the display can automatically and periodically alternate between displaying the left side view in full screen mode and the right side view in full screen mode. For added safety, such full screen display can include indicia (such as a large arrow pointing to the direction—left or right—of the sensor from which the video feed is currently being displayed) In various embodiments, the displayed video allows the driver to see in one or both directions, or selectively view one or the other. The camera can be provided with a preset or variable zoom lens, allowing the driver to focus over a greater or lesser distance.

Figure 4:
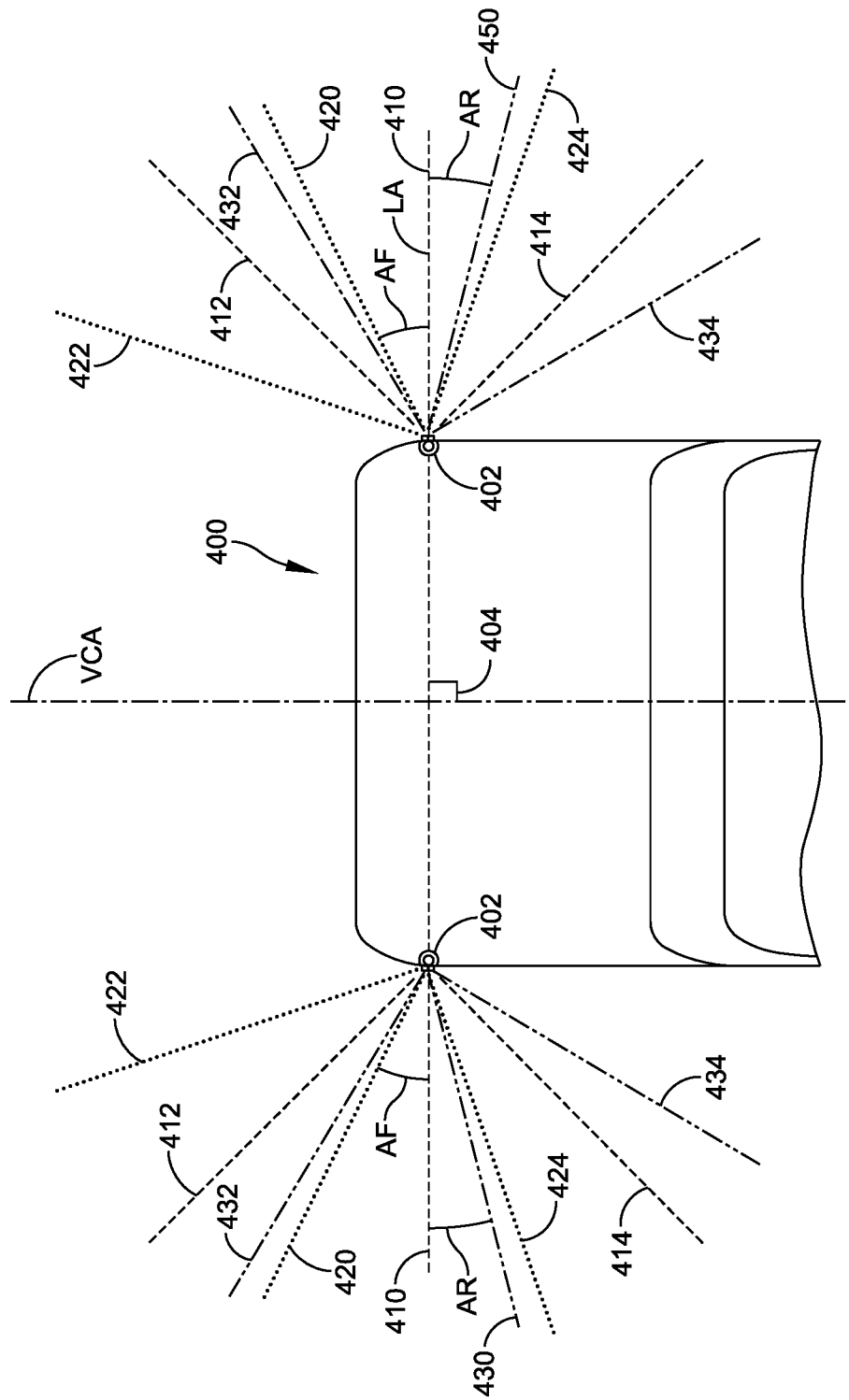
FIG. 4 is a schematic view of a plurality of fields of view for exemplary front-end cameras situated in a vehicle according to an illustrative embodiment.

FIG. 4 is a schematic view of the field of view for front-end cameras 402 mounted on an exemplary vehicle 400. The lateral axis LA is perpendicular 404 to the vehicle center axis VCA and passes through the center points of the front-end cameras 402 according to an illustrative embodiment. The lateral axis LA is defined as an axis projected perpendicular to the vehicle centerline axis, which is the centerline of the vehicle and projects from front to rear. The field of view of each camera 402 is depicted in this embodiment as describing 90 degrees. The camera field of view is adjustable up to approximately 30 degrees forward AF of the lateral axis LA and up to approximately 10 degrees rearward AR of the lateral axis. In various embodiments, the angular adjustments forward and rearward are greater or lesser as desired. The optical axis 410 (shown in dashed line) of cameras oriented on the lateral axis LA and having a field of view of 90 degrees will be provided with a forward limit 412 (shown in dashed line) of 45 degrees forward of the lateral axis LA and a rearward limit 414 (shown in dashed line) of 45 degrees rearward of the lateral axis LA. When a camera is advanced so that its optical axis 420 (shown in dotted lines) is oriented 30 degrees forward of the lateral axis LA, its forward limit 422 (shown in dotted lines) is 80 degrees forward of the lateral axis LA and its rearward limit 424 (shown in dotted lines) is 15 degrees rearward of the lateral axis LA. When the camera is oriented so that its optical axis 430 (shown in dashed and double dotted line) is 10 degrees rearward of the lateral axis LA its forward limit 432 (shown in dashed and double dotted line) is 35 degrees forward of the lateral axis LA and its rearward limit (shown in dashed and double dotted line) is 55 degrees rearward of the lateral axis LA. In further embodiments, in which the field of view is greater or lesser than 90 degrees and the range of camera orientation if greater or lesser, these field of view limits will vary. Note, as used herein, directional and orientational terms such as "top", "bottom", "front", "rear", "up", "down", "forward", "rearward", "horizontal", "vertical", "right", "left", "above" and "below" as well as their synonyms, are meant to be relative only and not absolute with respect to the acting direction of gravity.

The optical axis can be adjusted on the vertical axis. In an embodiment, the optical axis can be raised approximately 30 degrees and lowered approximately 10 degrees relative to the horizon. This vertical adjustment can be useful when approaching a hillside road from an entry that is relatively level. Adjustment of the camera elevation can compensate for the slope of the traffic lane and avoid potential blind spots.

Figure 5:
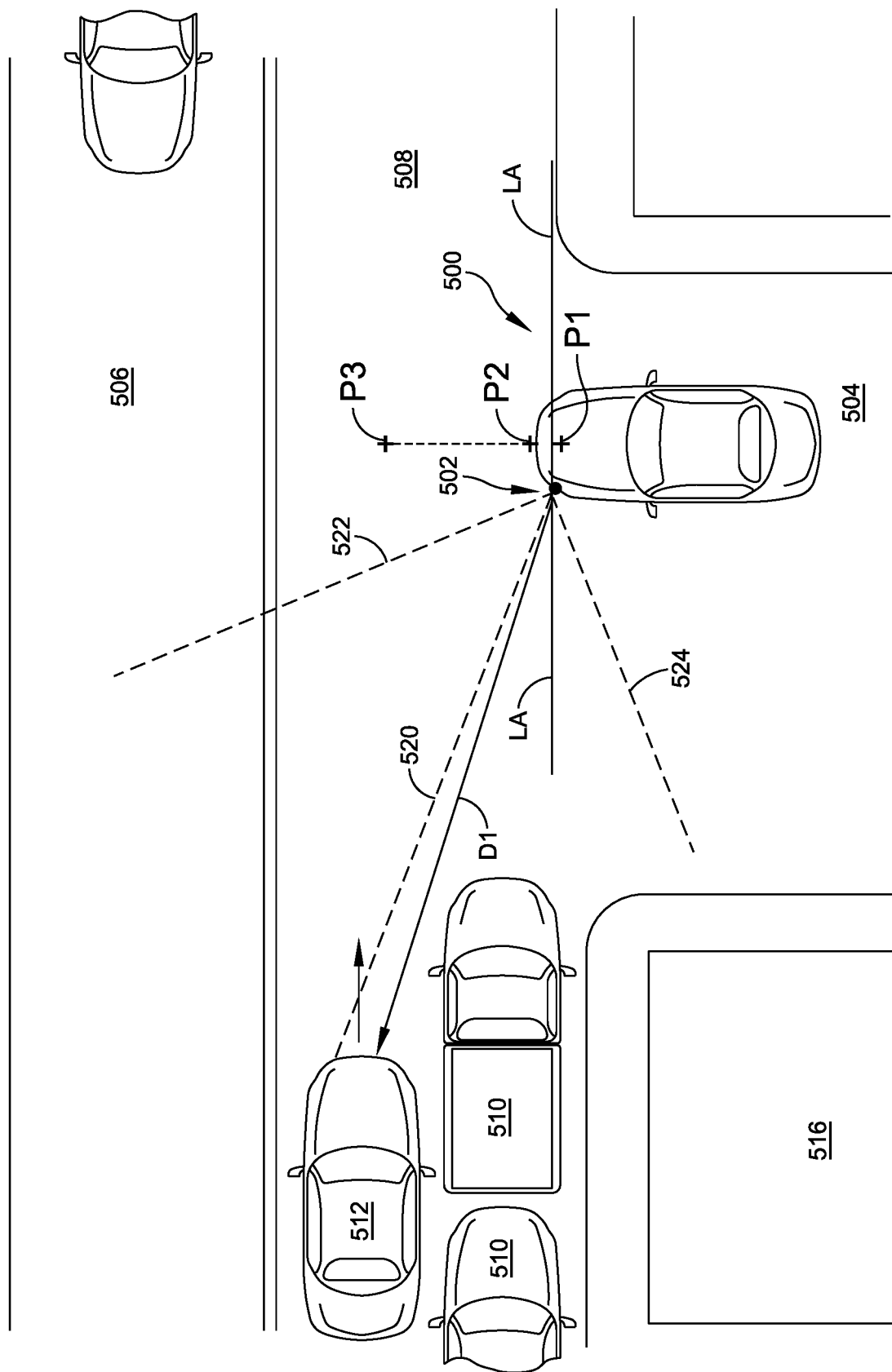
FIG. 5 is an overhead view of an intersection with oncoming traffic wherein one of the vehicles employs a camera system, according to an illustrative embodiment.

FIG. 5 is a top plan view of an exemplary intersection and depicts a vehicle 500 that is furnished with an installed front left camera system 502. In this embodiment, the vehicle 500 is situated at point PI on an intersecting street 504 and is preparing to enter a street 506 that is perpendicular to the intersecting street 504. The driver of the vehicle 500 has an obstructed view of the near lane 508, because of a line of parked cars 510. There is an oncoming car 512. In an embodiment, the distance D1 between vehicles is about 100 feet and reducing based on the rate of travel of vehicle 512. The driver of vehicle 500 moves forward six inches to point P2 and uses the camera system. The front left side camera 414 provides a view across a 90 degree field of view that includes an obstructing building 516. The driver inches forward until a view of the lane 508 beyond the obstructing building 516 and line of cars 510 can be obtained. The optical axis of the camera field of view 520 is oriented approximately 25 degrees forward of the vehicle lateral axis LA and the field of view is set at 90 degrees. FIG. 5 shows the forward limit 522 of the camera field of view. The driver visually checks the projected camera view on the navigational display (not shown) and notices approaching vehicle 512. At this point, the driver cannot yet visually see vehicle 512 without the front left camera 514. As set forth above, this display can be accompanied by a proximity alert. The driver of vehicle 500 is now aware of vehicle 512 and decides to refrain from moving into lane 508 until vehicle 512 has passed. In a traditional vehicle not having the camera system, the driver of vehicle 500 was required to advance to point P3, well into the path of vehicle 512, before being able to personally view the oncoming traffic.

Figure 6:
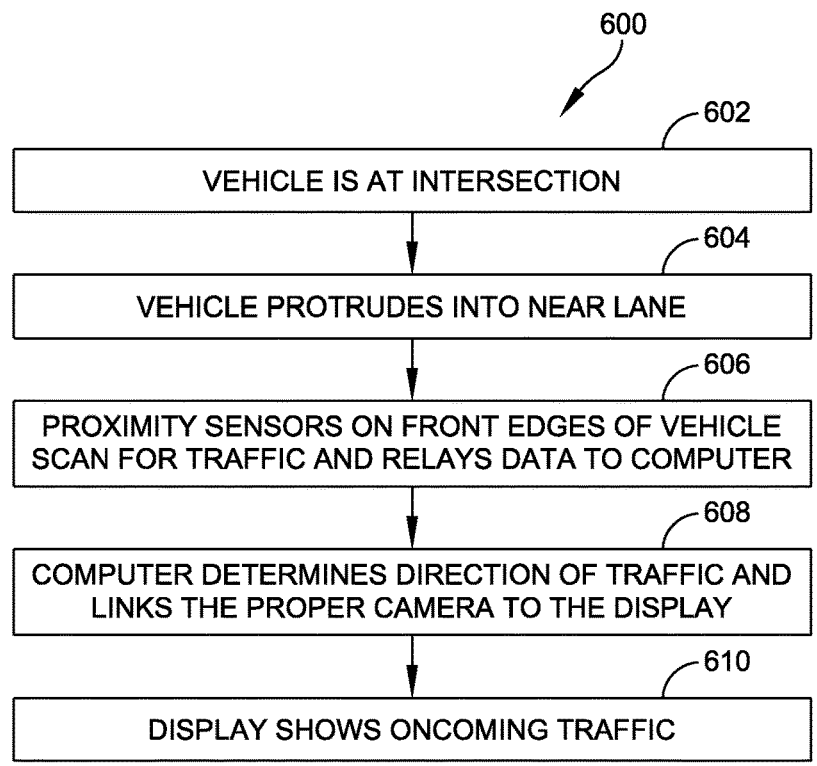
FIG. 6 is a schematic view of the activation of the camera system following selection using proximity sensors to determine the direction of traffic, according to an illustrative embodiment.
Figure 7:
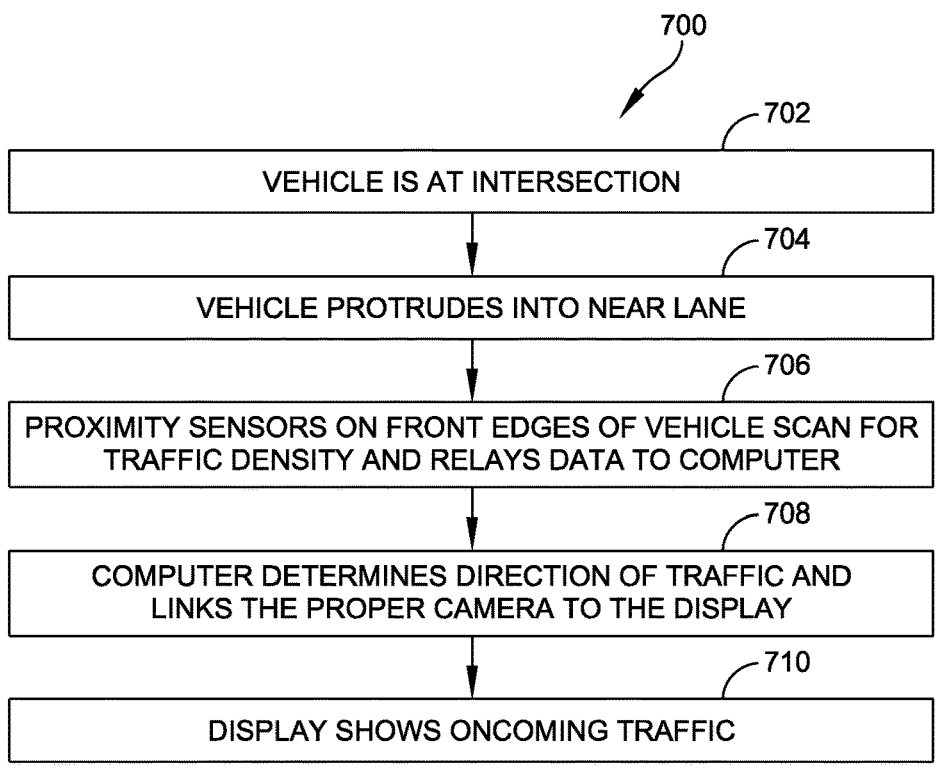
FIG. 7 is a schematic view of the activation of the camera system following selection using proximity sensors to determine the density of traffic, according to an illustrative embodiment.

The use of proximity sensors to automatically select one or the other camera for display is shown in FIGS. 6 and 7. Referring now to FIG. 6, a vehicle is equipped with two front end cameras, a respective camera mounted to each of the front end quarter panels. Each camera is equipped with a proximity sensor. The automatic process 600 begins when the vehicle arrives at the intersection 602 and the driver moves forward to cause the front end of the vehicle to protrude 4-6 inches into traffic 604. The proximity sensors begin scanning either direction and the data gathered from each is relayed to the computer 606. The computer processor evaluates the data and determines the direction of traffic in the near lane. When that process is complete, the computer determines which camera is preferred 608 and the feed from that camera is shown on the display 610.

For example, in some embodiments, if both proximity sensors detect moving vehicles in their respective fields of view, the computer selects the camera on the same side of the car as the proximity sensor which senses the closer of the moving vehicles. In other embodiments, the proximity sensors provide location and speed data for vehicles in their field of view; the computer estimates an amount of time before the detected cars on each side reach the intersection, and selects the camera on the same side of the car as the proximity sensor which senses the moving vehicle which is expected to reach the intersection first. For example, in some embodiments, the computer calculates the time as the ratio of (distance from intersection/speed) In some embodiments, the computer compares the estimated length of time till arrival for the detected cars on each side to a threshold length of time within which the driver can safely enter the desired traffic lane. If the estimated time till arrival is less than the threshold, an alert is provided. In some embodiments, an audio or video alert notifies the driver from which side a detected moving vehicle is expected to arrive in the intersection first.

In the event that there is no traffic present, the camera display will revert to a default setting, for example, to a split screen display.

In other embodiments, as further shown in FIG. 7, a process to automatically select the camera to be displayed uses proximity sensors to determine traffic density 700. The begins when the vehicle arrives at the intersection 702 and the driver moves forward to cause the front end of the vehicle to protrude 4-6 inches into traffic 704. The proximity sensors begin scanning either direction to read traffic density in both directions and the data gathered from each is relayed to the computer 706. The computer processor evaluates the data and determines the density of traffic in the near lane. When that process is complete, the computer determines which camera is preferred 708 and the feed from that camera is shown on the display 710. In the event that there is no traffic present, the camera display will revert to a default setting, for example, to a split screen display.

Figure 8:
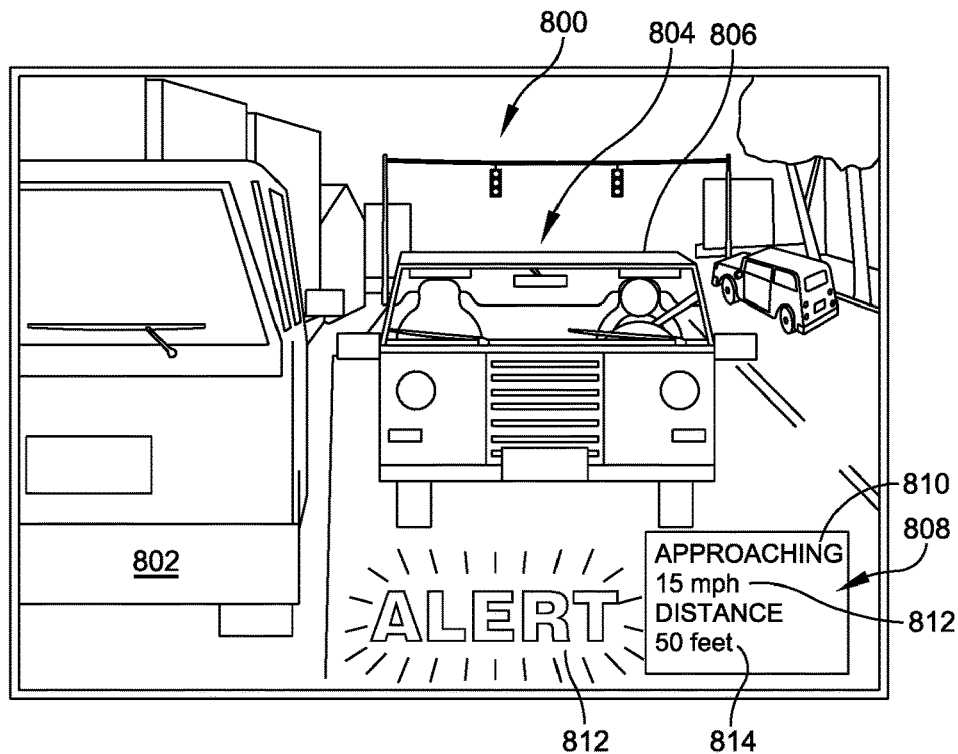
FIG. 8 is a view of an exemplary single screen display of oncoming traffic in a single lane, according to an illustrative embodiment.
Figure 9:
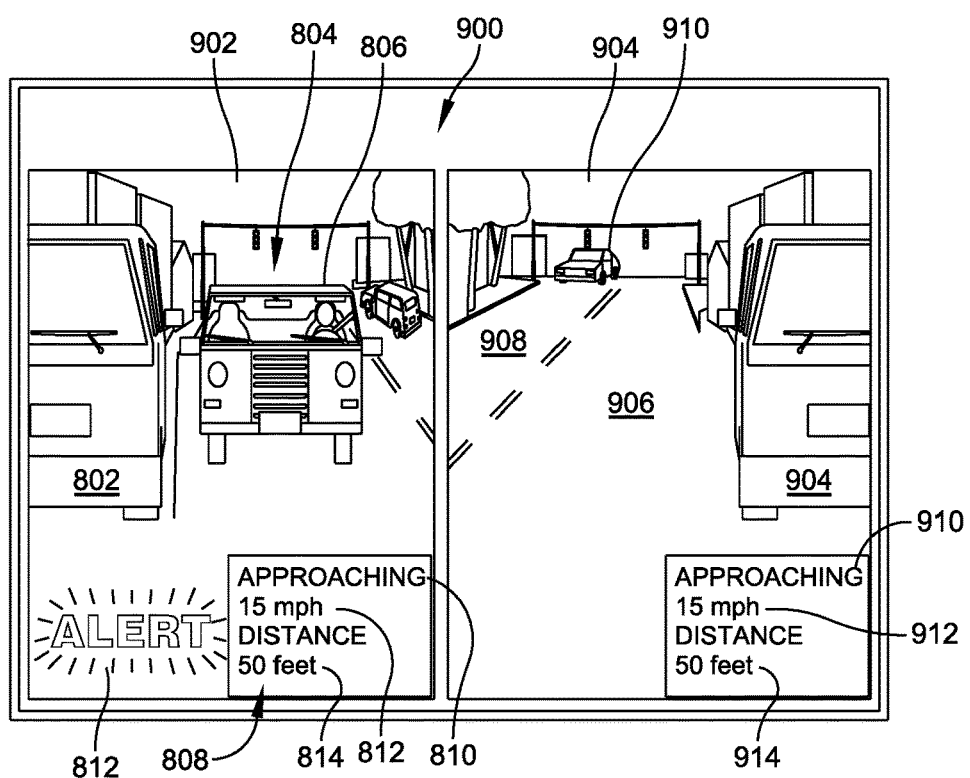
FIG. 9 is a view of an exemplary split screen display of oncoming traffic in opposite lanes, according to an illustrative embodiment.

The displayed view from the cameras can be displayed on the navigational device display, as set forth above. FIGS. 8 and 9 show the view as projected on the display using single and split screen views. FIG. 8 shows the view 800 from a left front-end camera with attached proximity sensor. The user has protruded the vehicle into the traffic lane far enough past a parked vehicle 802 for the camera to see the oncoming traffic 804. The proximity sensor detects oncoming vehicle 806 and detects that the vehicle is about 50 feet away and closing on the user. The proximity sensor transmits this data to the computer (not shown) and the computer presents the proximity sensor information 808 as part of the display. In an illustrative embodiment, the information provided is that a vehicle is approaching 810 at a rate of 15 miles per hour 812 and is at a distance of 50 feet from the camera. In some embodiments, the information can be provided using the metric system and with other information. This information is also sent through the proximity sensor alert process (144 in FIG. 1, above) and meets the alert process criteria for generating an alert 812 that is included on the display. In some embodiments, this alert can be flashing, accompanied by sounds and/or other stimulating sounds and lights to get the user's attention and discourage the user from entering the lane and creating a potential crash. Alternatively, or additionally, the alert cause the entire screen to assume a particular tint (e.g., red) to attract the user's attention.

FIG. 9 is a view of a split screen display 900 with the left view 902 showing the display view of FIG. 8 above. The right screen 904 shows a view of the street opposite from the view of the left screen 902 and is the view of the right front-end camera with an attached proximity sensor. There is a parked car 904 along the curb and the near lane 906 is clear of obstacles to the right. The farther lane 908 is mostly clear, with one approaching vehicle 910 at a distance. The proximity sensor notes the approaching vehicle 910 and transmits this data to the computer (not shown) and the computer presents the proximity sensor information 912 as part of the display. The computer uses one or more algorithms to determine speed, distance, high speed, and/or estimated time of arrival of the detected vehicles in the intersection, and to evaluate if an alert should be issued to the user when a predetermined criteria/threshold has been met. In an illustrative embodiment, the information provided is that a vehicle is approaching 910 at a rate of 15 miles per hour 812 and is at a distance of 200 feet from the camera. This information is also transmitted to the proximity sensor alert process (as set forth above) but it does not meet the criteria and no alert is provided.

Figure 10:
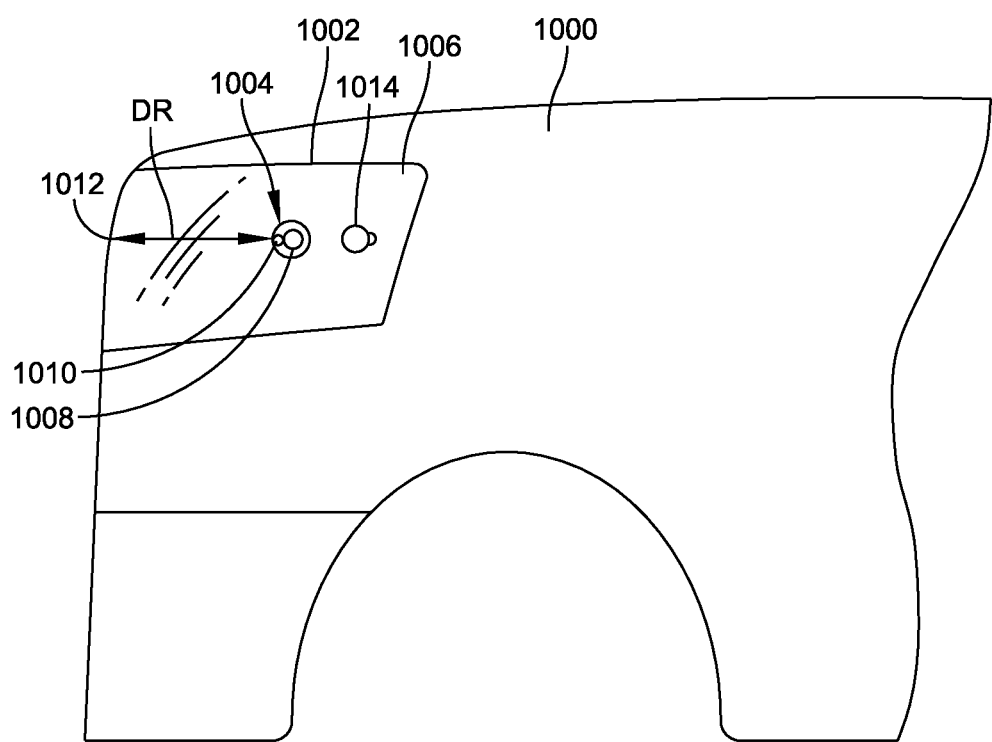
FIG. 10 is a frontal view of an exemplary front headlight housing with a front end camera retrofitted into the housing, according to an illustrative embodiment.

The front-end camera system can be provided as part of a kit and can be retrofitted into existing vehicle headlight pod assemblies. FIG. 10 shows the left side of the front end of a vehicle 1000 having a headlight housing 1002. The user has caused a mounting hole 1004 to be cut into the inner wall 1006 of the housing 1002. The camera assembly 1008 with the proximity sensor 1010 is situated a distance DA of approximately six inches from the front end of the car 1012. The camera system and proximity system do not interfere with the functionality of the headlight 1014. The installed camera and sensor assembly can be powered directly from the vehicle wiring harness or by another power source (for example, solar). In some embodiments, the solar cell is located in a transparent part of the pod or externally mounted in a holder on the exterior of the front quarter panel. The camera and proximity data can be transmitted by wired communication or by wireless communication. In other embodiments, the camera and sensor assembly can include a local control circuit for guided or automatic control.

In some embodiments, the front-end camera system can be provided with a built-in sensor that detects the speed and distance of an oncoming vehicle. This can be added to a system having a camera and a proximity sensor or to a system that is a camera on its own. In the latter case, the data from the detected range and speed of the oncoming traffic can be used to trigger a proximity sensor, based on pre-set parameters. Vehicular front-end cameras equipped with laser rangefinders use commercially available devices, including laser, radar parallax, and/or other technologies.

The system described above enhances the safety of the driver under ordinary traffic conditions and in more challenging situations. The system desirably avoids undue distraction and can be applied readily to re-manufacture or retrofit applications.

Further, the system can employ conventional, commercially available components, and/or customized components. Also, as used herein the terms "process" and/or "processor" should be taken broadly to include a variety of electronic hardware and/or software based functions and components. Moreover, a depicted process or processor described herein can be combined with other processes and/or processors described herein or divided into various sub-processes or processors. Such processes, processors, sub-processes and/or sub-processors can be combined according to various embodiments, and all such combinations are included herein as part of this disclosure. Likewise, it is expressly contemplated that any function, process and/or processor here herein can be implemented using electronic hardware, a non-transitory computer-readable storage medium encoded with software program instructions, or a combination of hardware and software.

The camera system as set forth above can include a solar-based power supply that includes a solar power collector and a power storage battery, enabling the system to be fully or partially powered by solar power.

The camera system described above can be equipped with cameras that operate both in daylight conditions and at night. It is expressly contemplated that the system can be provided with a night-time application that utilizes existing night vision technology (for example, infrared, passive, photo-multiplier devices or other night vision system that acquires information in various wavelengths). This can be utilized to detect non-lighted objects in the motor way, including but not limited to trashcans, pedestrians, animals, wrecked vehicles and other hazards.

Figure 11:
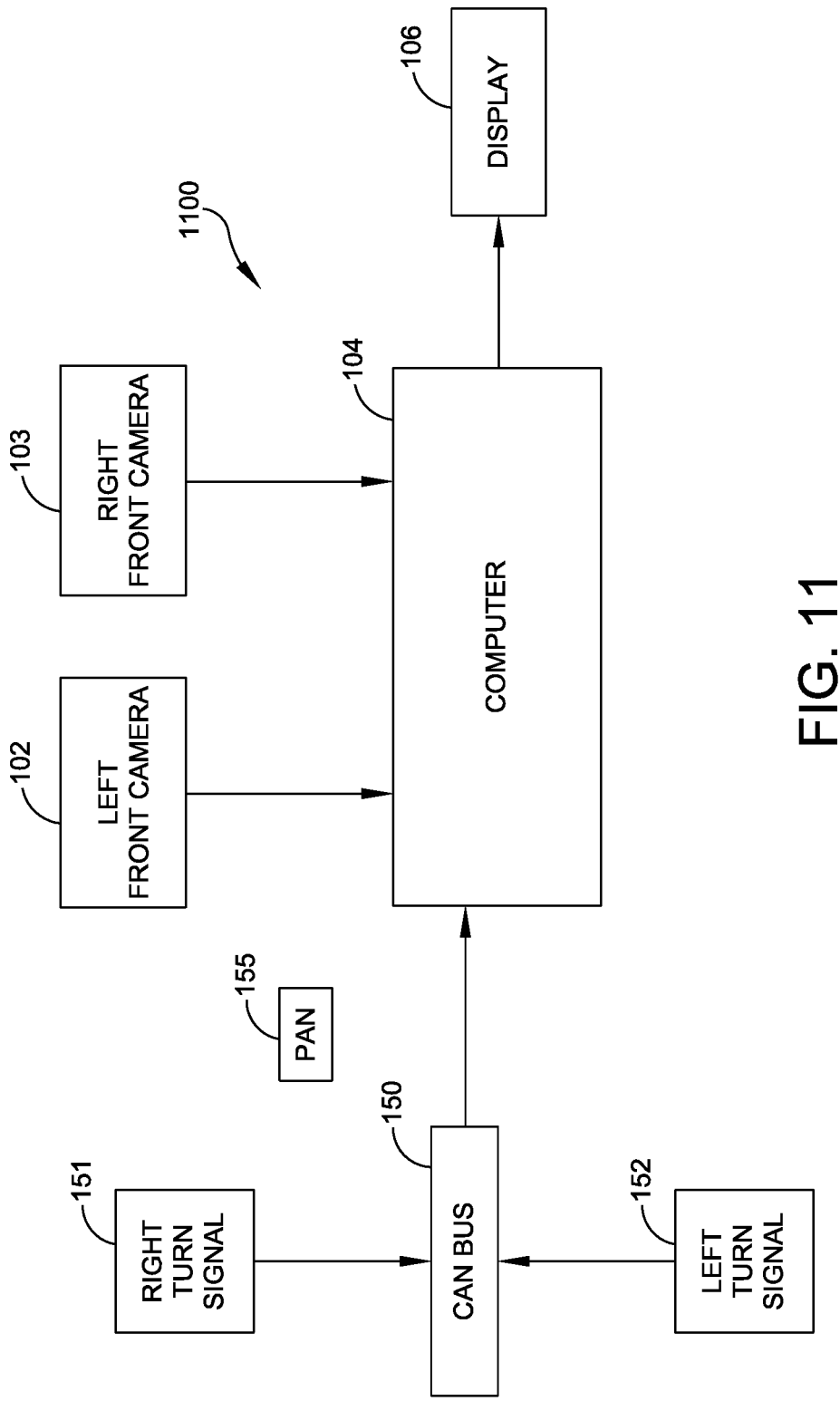
FIG. 11 is a block diagram of an embodiment of the system activated by turn signals.
Figure 12B:
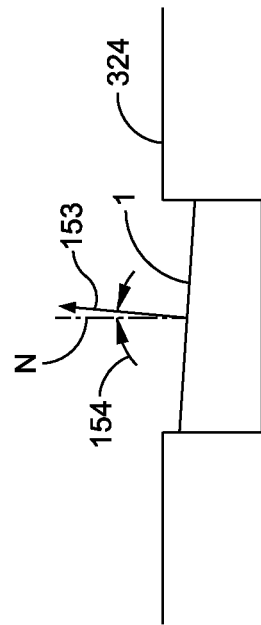
FIGS. 12A and 12B show flush mounted and recessed cameras, respectively.
Figure 12A:
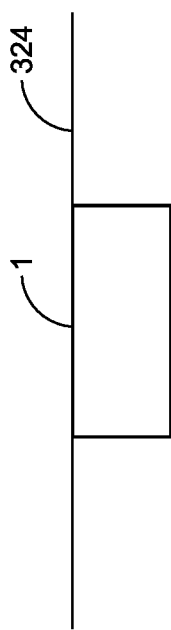

In some embodiments, the front quarter panel camera system activation is triggered by activation of the left turn signal 152 or right turn signal 151. FIG. 11 is a block diagram of an example according to some embodiments. In FIG. 11, a system 1100 for providing visual information to a driver of a vehicle comprises at least one flush-mounted or recessed camera located at least in a front quarter panel of the vehicle. In the example of FIG. 11, both a left front quarter panel camera 102 and a right front quarter panel camera 103 are provided. The cameras 102, 103 image a field of view of approximately 90 degrees in at least one of a horizontal plane and a vertical plane. In some embodiments, as shown in FIG. 12A, the camera 102 is mounted flush with the surface of the left or right quarter panel 324. In other embodiments, as shown in FIG. 12B, the camera 103 is recessed slightly beneath the surface of the quarter panels. In some embodiments, as shown in FIG. 12B, a center 153 of the field of view of each camera is offset by an angle 154 from 0 degrees to about 17 degrees forward of a surface normal N of a side of the vehicle (left or right quarter panel). In some embodiments, the angle 154 is from about 5 degrees to about 15 degrees. By orienting the cameras 102, 103 at a small angle, the forward travel of the vehicle into the intersection to view a given object on video using the front quarter panel cameras 102, 103 can be reduced in some embodiments.

The vehicle includes a display 106 within the vehicle that provides the driver with at least one of images or video feed of a scene imaged by the camera. In some embodiments, the display 106 is the screen of an onboard navigation system. In other embodiments, the display is the display of a mobile device, such as a tablet or smart phone. In some embodiments, the mobile device interfaces to the camera via a personal area network (PAN) 155, such as a Bluetooth interface in the vehicle, which is connected to the CAN bus 150 (or other vehicle bus).

An onboard computer 104 detects whether a turn signal 102 or 103 of the vehicle is activated and selectively causes the images or video feed to be displayed on the display 106 when the turn signal 102 or 103 of the vehicle is activated. In some embodiments, the control signals which drive the turn signals are passed to the computer 104 via a controller area network (CAN) bus 150 or using another on board diagnostic (OBD-II) protocol.

In some embodiments, the onboard computer 104 is configured to cause the display 106 to display at least one of images or video from the first camera 102 and at least one of images or video from the second camera 103 on a split screen image, in the manner shown in FIG. 9.

In some embodiments, the onboard computer causes the displaying of the images or video feed to continue as long as the turn signal 151, 152 of the vehicle is still activated. The onboard computer causes the displaying of the images or video feed to stop when the computer determines that the turn signal of the vehicle is no longer activated.

Figure 13:
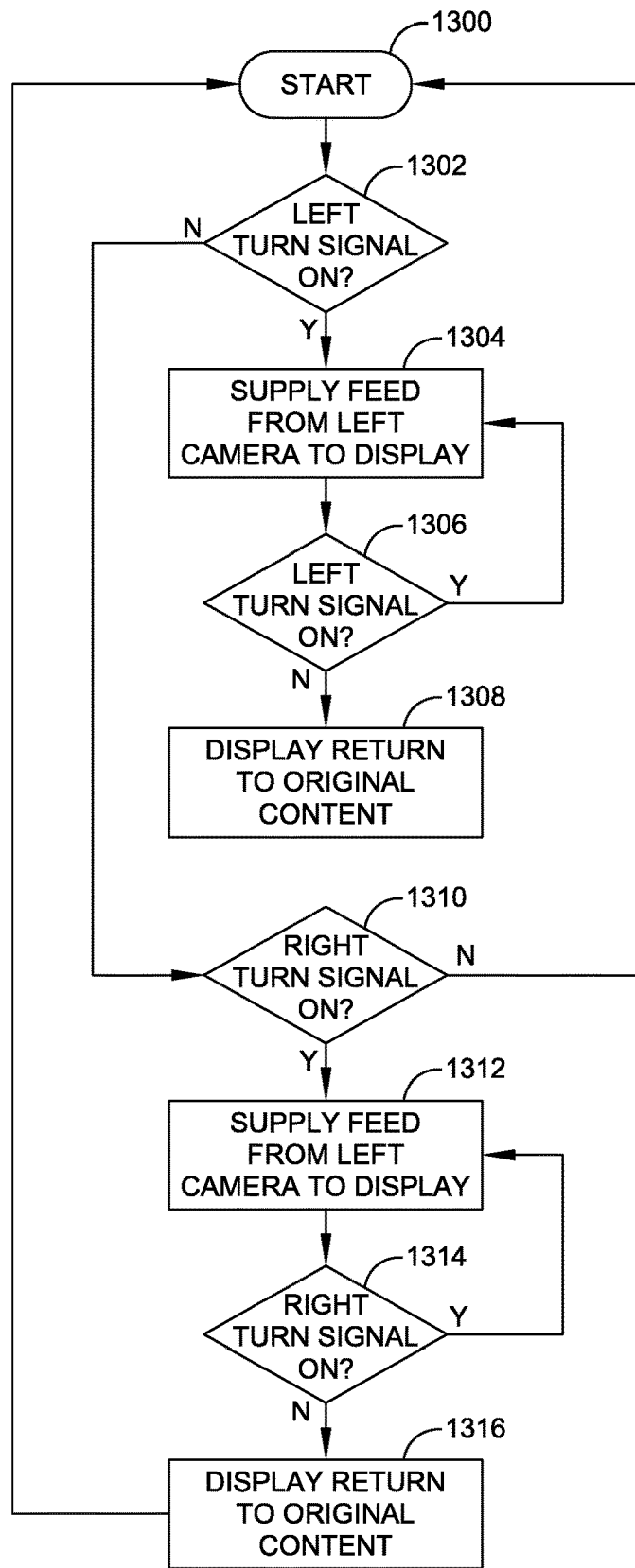
FIG. 13 is a flow chart of a method of activating the system in single video display mode according to some embodiments.

FIG. 13 is a flow chart of a method of operating the system 1100 of FIG. 11 for a single image or video feed.

At step 1302, the computer 104 determines whether the left turn signal 152 is on. If the left turn signal 152 is on, step 1304 is performed. Otherwise, step 1310 is performed.

At step 1304, the computer 104 causes the image or video feed from the left camera 102 to be displayed on the display 106.

At step 1306, the computer 104 periodically checks whether the left turn signal is still turned on. If the left turn signal is still on, the image or video feed is continued at step 1304. If the left turn signal is no longer on, step 1308 is performed.

At step 1308, the computer 104 causes the display 106 to return to its previous content. For example, if the display was showing a navigational route prior to initiating the turn, the display 106 is returned to the control of the navigation system.

At step 1310, the computer 104 determines whether the right turn signal 151 is on. If the right turn signal 151 is on, step 1312 is performed. Otherwise, execution returns to the beginning of the loop at step 1300.

At step 1312, the computer 104 causes the image or video feed from the right camera 103 to be displayed on the display 106.

At step 1314, the computer 104 periodically checks whether the right turn signal is still turned on. If the right turn signal is still on, the image or video feed is continued at step 1312. If the right turn signal is no longer on, step 1316 is performed.

At step 1316, the computer 104 causes the display 106 to return to its previous content.

Figure 14:
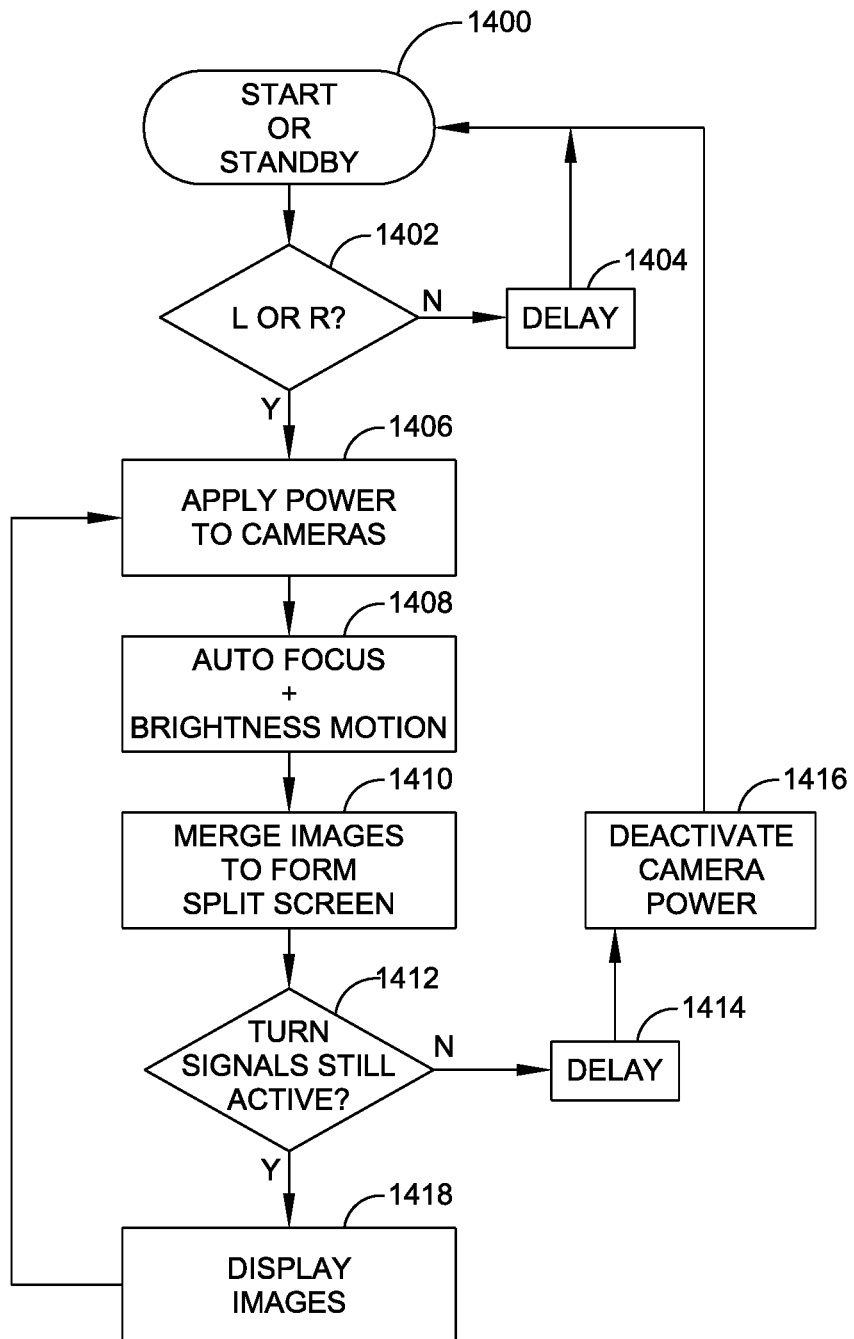
FIG. 14 is a flow chart of a method of activating the system in split screen display mode according to some embodiments.

FIG. 14 is a flow chart of an embodiment for split screen viewing of image or video feed from both left and right front quarter panels 102, 103.

At step 1402, the computer 104 determines whether either the left or right turn signal 151, 152 is turned on. If either is turned on, step 1406 is performed. If neither turn signal 151, 152 is turned on, step 1404 is performed.

At step 1404, the computer waits for a predetermined period and returns to the beginning of the loop at step 1400.

At step 1406, the computer 104 causes power to be supplied to the cameras 102 and 103.

At step 1408, each of the cameras 102, 103 performs auto focus and brightness/motion detection.

At step 1410, the computer 104 receives the image or video feeds from both cameras 102, 103 and merges the two feeds to form a split screen (e.g., as shown in FIG. 9).

At step 1412, the computer 104 determines whether the turn signal 151 or 152 is still active. If the turn signal 151, 152 is still active, step 1418 is performed. If neither turn signal is active, step 1414 is performed.

At step 1414, the computer 104 waits for a predetermined period (e.g., 5 seconds) after the turn signal 151, 152 is turned off.

At step 1416, the computer 104 causes deactivation of camera power supplied to cameras 102, 103. The computer returns the program counter to perform step 1400, and the image/video display system goes to standby mode.

At step 1418, the split screen images or video is displayed on the display device 106.

Although the above-described embodiments include front quarter panel mounted cameras 102, 103, in other embodiments, the system includes at least one camera 1505, 1506. The camera(s) 1505, 1506 can be flush mounted or recessed relative to the surface on the left rear quarter panel 1507 and/or right rear quarter panel 1508. The cameras 1505, 1506 are configured to image a field of view 1520, 1525, respectively, within an arc of approximately 90 degrees in both the horizontal and vertical axes. In other embodiments, the field is greater or lesser than 90 degrees in the horizontal and/or vertical axes. In some embodiments, the left and/or right rear quarter panel cameras 1505, 1506 are positioned within about six inches (15 cm) of the rear end of the quarter panel(s) 1507, 1508, respectively.

The rear quarter panel mounted camera(s) 1505, 1506 provide video of traffic coming from one or both directions when the vehicle 1500 is backed out (e.g., from a driveway) into a street 506. In some embodiments, both left and right rear quarter panel cameras 1505, 1506 provide images or video to be displayed by a passenger compartment display 106, such as the navigation system display.

Figure 15:
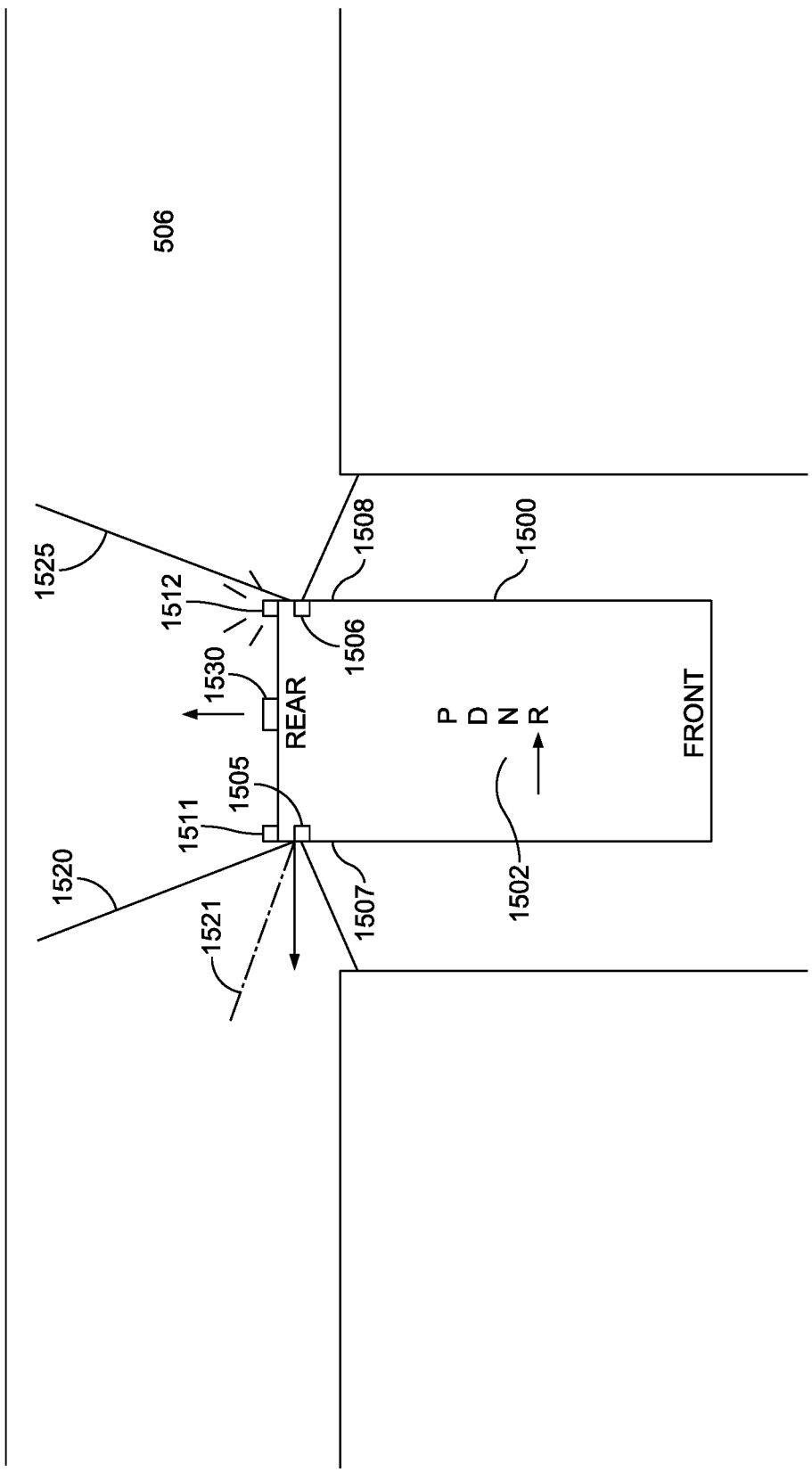
FIG. 15 is a schematic diagram showing an embodiment having rear quarter panel cameras.

In some embodiments, the left and/or right rear quarter panel cameras are activated when the driver places the transmission 1502 into reverse gear (indicated by "R" in FIG. 15), and deactivated when the transmission 1502 is no longer in reverse gear.

In other embodiments, either the right or left rear quarter panel camera 1505, 1506 is activated when the driver places the transmission 1502 into reverse gear, and the right turn signal 1511 or left turn signal 1512, respectively, is activated. When the transmission 1502 is no longer in reverse gear, or the turn signals 1511, 1512 are both deactivated, the video feed from the right or left quarter panel camera 1505, 1506 is deactivated.

In some embodiments, the car is equipped with both a rear facing camera 1530 and right and left rear quarter panel cameras 1505, 1506, respectively. Either the right or left rear quarter panel camera 1505 or 1506 (or both) is (are) activated when the driver places the transmission 1502 into reverse gear, and the right or left turn signal 1511, 1512, respectively, is activated. If the transmission 1502 is in reverse gear, but neither right nor left turn signal 1505, 1506 is activated, the video feed from the rear facing camera 1530 is displayed. When the transmission 1502 is no longer in reverse gear, the display returns to the navigation display.

In some embodiments, the vehicle is equipped with front left quarter panel camera 102, front right quarter panel camera 103, rear right quarter panel camera 1505 and rear left quarter panel camera 1506. One or both of the front quarter panel cameras 102, 103 are activated when the transmission is in "Drive" (for an automatic transmission) or first gear (for a standard or semiautomatic transmission), and the left turn signal 152 or right turn signal 151 is activated. One or both of the rear quarter panel cameras 1505, 1506 are activated when the transmission is in reverse, and the left turn signal 152 or right turn signal 151 is activated.

Figure 16:
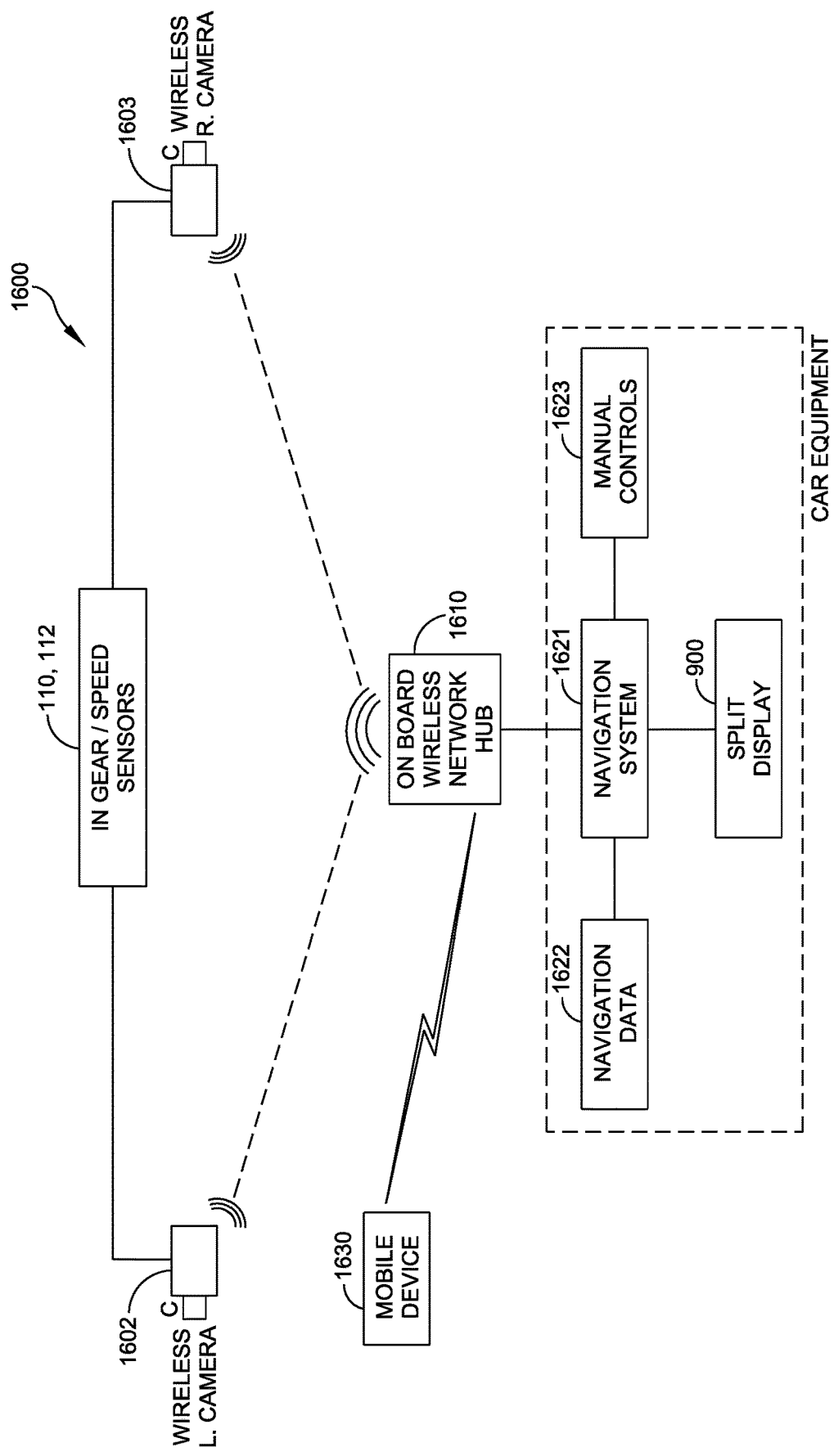
FIG. 16 is a block diagram of an embodiment of quarter panel camera system using wireless communications.

FIG. 16 is a block diagram of an embodiment of a system 1600 including one or more wireless devices.

The system 1600 includes at least one wireless camera on one of the front quarter panels. For example, a wireless camera 1602 transmits image or video data from the left front quarter panel, and a wireless camera 1603 transmits image or video data from the right front quarter panel.

In some embodiments, the right and left wireless cameras 1602, 1603 are activated by the in-gear sensor 110 or speed sensor 108 as described above, or by the computer 104 determining that the right or left turn signal 151, 152 is activated. For example, in one embodiment, a proximity and speed sensor determines the range of an oncoming object and the computer 104 (FIG. 1) provides an alert when the object is at least one of (a) within a predetermined distance of the vehicle, (b) approaching at a speed greater than or equal to a predetermined speed, or (c) expected to reach a location of the vehicle in less than a predetermined length of time. In one embodiment, the computer 104 calculates the expected length of time till the object reaches the intersection by dividing the distance (between the object and the vehicle) by the current speed of the object.

The image or video data are received by a corresponding wireless network hub 1610. In some embodiments, the cameras 1602, 1603 communicate with hub 1610 by a wireless protocol, such as 802.11 (WiFi) or Bluetooth.

In some embodiments, the wireless network hub 1610 is connected to the car equipment 1620, which can include: a navigation system 1621 coupled to a non-transitory machine readable storage medium 1622 encoded with navigation data. The navigation system 1621 includes manual controls 1623 for operating the navigation system and/or configuring the quarter panel camera and display system 1600. In some embodiments, the manual controls 1623 permit the driver to select either full screen or split screen mode for display. A display 900 is provided to display the navigation data when the quarter panel cameras are not active, and display the image or video feed from the front quarter panel cameras when the cameras are activated.

In some embodiments, a mobile device 1630, such as a smart phone or tablet communicates with the hub 1610 by a wireless protocol, such as 802.11 (WiFi) or Bluetooth. In some embodiments, the mobile device runs a mobile app which, when activated, waits for the image or video feed from the cameras 1602, 1603, and displays the video feed on the mobile device 1630. The activation of the image or video feed is controlled according to one of the methods described herein, such as based on current transmission state, current vehicle speed, object proximity, and/or turn signal activation.

In other embodiments, the mobile app is configured to allow the user to manually activate and deactivate the cameras 1602, 1603 using a graphical input screen on the mobile device, independently of the transmission state, vehicle speed, object proximity, and turn signal activation. Once the cameras are activated, the mobile device 1630 continuously displays the image or video feed(s) from the left or right camera 1602 or 1603, or both, until the user manually deactivates the feed(s) using the mobile device. In some embodiments, when the mobile app manually activates the front quarter panel cameras, the displaying of the image/video feed from the cameras on the navigation system display is suspended until the mobile app is terminated. By using the mobile device 1630 for displaying the image or video feeds from the cameras 1602, 1603, the user avoids any interruption of the normal navigation system display. The driver may prefer to use this feature, for example when navigating a route with frequent closely spaced turns.

In some embodiments, the system is voice activated. For example, in an embodiment using a mobile device 1630, the mobile app for controlling the front quarter panel cameras 1602, 1603 is responsive to voice commands. A computer (not shown) within the mobile device 1630 causes the display of image data from either the left or right front quarter panel cameras in response to a voice command issued to the mobile device. In some embodiments, the computer within the mobile device 1630 causes the display of image data from both the left and right front quarter panel cameras in split screen mode in response to a voice command.

Although FIG. 16 is described above for an example in which the left and right cameras 1602, 1603 are on the front quarter panels, in other embodiments, the cameras 1602, 1603 are flush mounted or recessed in the left and right rear quarter panels, and all the remaining discussion of FIG. 16 applies fully with substitution of rear quarter panel cameras.

In some embodiments, the visual display can use a heads-up projected display system, the onboard computer display, a separate and dedicated display or a link to a head-mounted glasses display worn by the driver. In other embodiments, there can be two cameras mounted in each of the front quarter panels, one of the left side as described above, and one on the right side, for vehicles entering a one-way street with traffic travelling from right to left relative to the driver or vehicles that may be transported between the United Kingdom and Europe, and back, or vice-versa. It is further contemplated that GPS systems can be used to determine the national driving customs based on location and to automatically preset the cameras. The GPS location can also be used to preset based on information of traffic patterns based on location and the latest available street traffic directions. It is contemplated that such a camera system as set forth above can be fitted onto trucks of all sizes, recreational vehicles, tractors, heavy equipment, cycles and motorcycles, quadricycles, military vehicles (such as tanks or other armored vehicles), or other vehicles.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

What is claimed is:

1. A system for providing front-oriented visual information to a vehicle driver comprising:
at least one camera located at least in one of a group consisting of a left forward side or a left front corner area portion of a vehicle or a right forward side or right front corner area portion of said vehicle, wherein the camera is configured to image a field of view in at least one of a horizontal plane and a vertical plane;
a left sensor and a right sensor determine a range of a left object on a left side of the vehicle and a right object on a right side of the vehicle, respectively;
alert information being generated based on said range from the vehicle of said left object and said right object;
a display within the vehicle for providing the vehicle driver with video feed of a scene to the right or left of the vehicle imaged by the camera and for providing the vehicle driver with said alert information; and
an onboard computer for processing the approaching vehicle speed and for selectively allowing the video feed of the scene to the left or right of the vehicle to be displayed on the display when the vehicle speed is less than a threshold speed and for deactivating displaying of the video feed when the vehicle speed reaches the threshold speed, wherein the computer is configured to determine a respective amount of time until each object is expected to reach a location of the vehicle for said alert information.

2. The system of claim 1 wherein:
said alert information comprises a flashing indicator or displaying a word including ALERT, said word either being stationary or flashing on said display.

3. The system of claim 1 wherein:
the at least one camera includes a flush-mounted or recessed camera, the onboard computer detects whether a turn signal of the vehicle is activated and selectively causes the images or video feed to be displayed on the display when the turn signal of the vehicle is activated.

4. The system of claim 1 wherein:
the system is voice activated and the computer causes the display of image data from the camera located at either a left or right forward side or front corner area portion of the vehicle in response to a voice command.

5. The system of claim 1, further comprising:
a network interface to transmit the video data to a mobile device within the vehicle, to be displayed by the mobile device.

6. The system as set forth in claim 1 wherein:
said left sensor and said right sensor determine a range of an oncoming object and wherein the computer provides said alert information when the object on the left side and the right side of the vehicle is at least one of (a) within a predetermined distance of the vehicle, (b) approaching at a speed greater than or equal to a predetermined speed, and (c) expected to reach a location of the vehicle in less than a predetermined length of time.

7. The system of claim 1 wherein:
a method of providing front oriented visual information to a vehicle driver comprises the steps of:
selectively activating at least one camera on a forward side or front corner portion of a vehicle when a turn signal of the vehicle is activated; and
receiving and displaying visual information from the camera of at least one of images and video while the turn signal is activated.

8. The system of claim 7 in which the method further comprises the step of:
receiving and displaying said visual information from the camera of at least one of images and video of a scene in a location containing oncoming traffic.

9. The system of claim 7 in which the method further comprises the steps of:
selectively activating a flush-mounted or recessed camera on a rear side or rear area portion of the vehicle when a transmission of the vehicle is in reverse gear and a turn signal of the vehicle is activated;
receiving and displaying visual information from the camera on the rear side or rear area portion of the vehicle of at least one of image and video while the transmission of the vehicle is in reverse gear and said turn signal is activated; and
discontinuing the displaying of visual information from the camera on the rear side or rear area portion of the vehicle when either the transmission of the vehicle is no longer in reverse gear or the turn signal is no longer activated.

10. The system as set forth in claim 1, wherein the display is an onboard navigation screen.

11. The system as set forth in claim 1, wherein the threshold speed can be adjusted by the driver of the vehicle to a speed of about 3 miles per hour, a speed range of 2-4 miles per hour, or a speed range of 3-5 miles per hour.

12. The system as set forth in claim 1, wherein said right sensor and said left sensor that determine the range of an oncoming object and wherein the computer provides said alert information when the object is at least one of (a) within a predetermined distance and (b) approaching at a predetermined speed.

13. The system as set forth in claim 8 in which the method further comprises the step of locating the camera in a front headlight pod and includes a wireless link to communicate with at least one of the display and computer.

14. The system as set forth in claim 1, wherein the onboard computer causes the video of an approaching vehicle and a speed and a distance of the approaching vehicle all to be displayed on the display.

15. A system for providing front-oriented visual information to a vehicle driver comprising:
a first camera located in a left forward side or front corner area portion of a vehicle and a second camera located in a right forward side or right corner area portion of the vehicle, wherein the first camera and the second camera are configured to image a field of view in at least one of a horizontal plane and a vertical plane;
a left sensor and a right sensor that determine a range of a left object on a left side of the vehicle and a right object on a right side of the vehicle;
alert information being generated based on said range from the vehicle of said left object and said right object respectively;
a display within the vehicle for providing a driver with video feed of a scene to the left and right sides of the vehicle imaged by the first camera and the second camera respectively; and
an onboard computer for processing a detected vehicle speed and for selectively allowing the video feed of the scene to the left and right sides of the vehicle to be displayed on the display when the vehicle speed is less than a threshold speed and for deactivating displaying of the video feed when the vehicle speed reaches the threshold speed, wherein the computer is configured to determine a respective amount of time until each object is expected to reach a location of the vehicle for said alert information.

16. The system of claim 15 wherein:
said alert information comprises a flashing indicator or a word including ALERT, said word being stationary or flashing on said display.

17. The system of claim 15 wherein:
said first camera and said second camera are flush-mounted or recessed within their respective left forward side or left front corner area portion of the vehicle and right forward side or right front corner area portion of the vehicle.

18. The system as set forth in claim 15, wherein the system is voice activated and the computer causes the display of image data from either a left or right forward side or corner area camera in response to a voice command.

19. The system of claim 15, further comprising a network interface to transmit the video data to a mobile device within the vehicle, to be displayed by the mobile device.

20. A method for providing visual information to a vehicle driver comprising the steps of:
automatically sensing when a speed of a driven vehicle is less than a threshold speed;
providing a right sensor and a left sensor that determine a range of a right approaching vehicle on a right side of a driven vehicle and a left approaching vehicle on a left side of the driven vehicle, respectively;
while the speed of the driven vehicle is less than the threshold speed, automatically collecting a first video feed of a first approaching vehicle on a left side of the driven vehicle, using a first camera located on a left forward side or left front corner area portion of the driven vehicle, said first camera is configured to image a field of view in at least one of a horizontal plane and a vertical plane, and automatically collecting a second video feed of a second approaching vehicle on a right side of the driven vehicle, using a second camera located on a right forward side or right front corner area portion of the driven vehicle, said second camera is configured to image a field of view in at least one of a horizontal plane and a vertical plane; and
while the speed of the driven vehicle is less than the threshold speed, automatically displaying video including the first and second video feeds on a display within the driven vehicle;
generating alert information based on said range from the vehicle of said first approaching vehicle and said second approaching vehicle;

providing an onboard processing means in said driven vehicle for determining the range of said right approaching vehicle and said left approaching vehicle wherein said processing means being configured for determining a respective amount of time until each approaching vehicle is expected to reach a location of the driven vehicle for said alert information.

\* \* \* \* \*